Sept. 29, 1925.
R. W. DORN
1,555,462
EMERGENCY RIM SECURING LUG
Filed Sept. 27, 1922
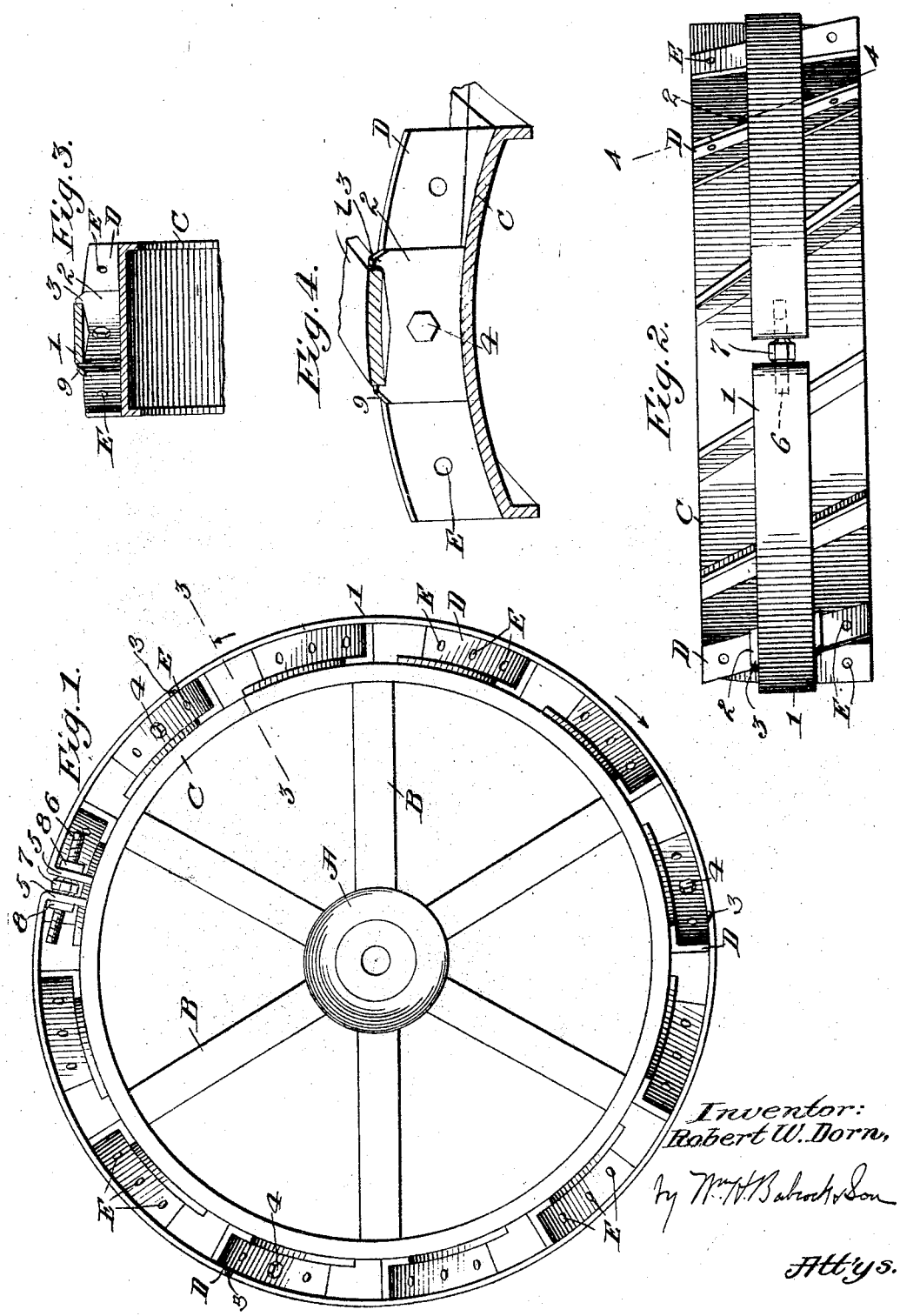
Inventor:
Robert W. Dorn,
by W. H. Babcock & Son
Att'ys.

Patented Sept. 29, 1925.

1,555,462

UNITED STATES PATENT OFFICE.

ROBERT W. DORN, OF LARKINS, FLORIDA.

EMERGENCY-RIM-SECURING LUG.

Application filed September 27, 1922. Serial No. 590,905.

*To all whom it may concern:*

Be it known that I, ROBERT W. DORN, a citizen of the United States, residing at Larkins, in the county of Dade and State of Florida, have invented certain new and useful Improvements in Emergency-Rim-Securing Lugs, of which the following is a specification.

This invention relates to supplementary or special service tires or tread bands or road bands for use on the rear or traction or drive or lug wheels such as used on agricultural tractors and is particularly adapted and intended for use in combination with drive wheels of the general type found upon the Fordson tractor to fit such tractors for travel over highways without damaging the latter beyond the usual wear and tear, and without damaging jar and vibration to the tractor.

It has for its objects to provide a split band which may be slipped, in a transverse direction, on the tractor wheels in engagement with the radially outer faces of the tractor lugs thereof and may be secured in position thereon and removed therefrom expeditiously by suitable adjusting means, to provide stops for said band, but entirely separate therefrom and having no positive connection thereto; to avoid any positive connection between any part of the road band and any part of the tractor wheel; to so form the stops that the band in being applied will engage inclined planes of said stops and be readily expanded radially thereby until seated between the shoulders of the respective stops; and to so form the adjacent ends of the band that they will be in supporting engagement with the surface of the tractor wheel between two adjacent traction lugs.

In the accompanying drawings:

Figure 1 represents a side elevation of a wheel with a road-band and positioning stops applied thereto in accordance with my invention;

Figure 2, a top plan view of the combination illustrated in Figure 1;

Figure 3, a sectional view on the line 3—3 of Fig. 1, looking in the direction of the arrows; and Figure 4, a sectional view on the line 4—4 of Figure 2, showing the road-band or emergency tire 1 and the rim C in perspective and broken away.

Referring now in detail to the drawings, A designates the tractor wheel hub, B the spokes of said wheel, C the rim and D traction lugs mounted on the radially outer peripheral face or tread thereof and each provided with a central and two end perforations E, all as well known and embodied, for instance, in the well known and very extensively used Fordson tractor.

When it is desired to run the tractor over the high-way a road-band or supplemental or emergency tire 1 is applied in a transverse direction to each rear or drive wheel, in its arranged relation bearing against the radially outer edges of the traction lugs D and lying between the bifurcations or shoulders 3 of each of a plurality of equi-distantly spaced bifurcated stops 2 secured respectively to several of the lugs D by any suitable means, a means found satisfactory in actual use being simply a bolt 4 passed through the central perforation in the respective lugs D and the perforations in their respective attached stops 2, and receiving a nut on its screw-threaded end as usual.

The band or emergency tire 1 is, preferably, made from a single piece of metal and has its ends adjacent each other, perforated, and bent abruptly radially, the radially presented portions 5 extending radially inwardly a distance corresponding to the distance radially from the radially outer face of rim C to the radially outer edge or face of any one of the traction lugs D.

A turn-buckle 6 having an enlarged angular portion 7 located between said adjacent end portions 5 and having its oppositely threaded portions extending through the perforations in said portions 5 and receiving on said oppositely threaded portions nuts 8 respectively and operated by any suitable wrench or other means has been found in actual use to be a satisfactory construction whereby to draw said end portions 5 toward each other to draw said band or emergency tire 1 into tight engagement with all of the traction lugs D or to loosen the band 1 to allow it to be removed, though, of course, any suitable tightening and loosening, or adjusting, means may be substituted therefor.

The stops 2 have their radially outer lateral corners cut away to form inclined planes 9 which extend radially inwardly at least to, and preferably beyond as shown, the radially outer edges of their respective traction lugs D. To apply the band 1 the adjusting means is first loosened sufficiently to allow said band to expand to such an extent that it will pass over the laterally outer shoulders or bifurcations 3 of the bifurcated stops 2, the band 1 is then applied to, and transversely of, the wheel, engaging the radially outer edges of the lugs D and moving transversely along the same until it engages the inclined planes 9 of the adjacent bifurcations or shoulders 3 of the respective stops 2, when further force exerted in the same direction will cause the band to expand radially and to move transversely of said wheel in engagement with said inclined planes 9 until it passes over said adjacent bifurcations or shoulders 3 and snaps into normal position between the shoulders or bifurcations 3 of the respective stops 2, when the adjusting means is to be operated to draw the portions 5 toward each other to contract the band 1 radially to draw it into firm contact with the radially outer edges of all of the respective lugs D, and the radially inner edges of the ends or portions 5 into contact with the radially outer face of the rim C. Of course the mode of operation or application may be varied by operating the adjusting means so as to allow expansion of the band 1 to a far greater degree than required, or by operating the adjusting means so as to temporarily entirely disconnect the portions 5 from each other.

One way found satisfactory for removing the band 1 is to operate the adjusting means to permit said band to be expanded to such degree that it will move over the shoulders or bifurcations 3 of the stops 2, when a prying tool or lever may be inserted between the rim C and band 1 and operated so as to separate a portion of said band 1 radially from said rim C sufficiently to clear the shoulders 3 of the stops 2 of said portion, and transversely of the wheel so as to unseat said portion of the band 1 from said stops 2, when the rest of the band may be pushed over transversely by hand and so off of said wheel.

The stops 2 are always to remain on the wheel as they project so slightly beyond the respective traction lugs D to which they are secured that they will not be subjected to injury. They, said stops, fit flat or flush against the adjacent face of their respective traction lugs D and each has preferably its radially inner edge or face of such shape as to conform to the adjacent portion, against which it bears, of the radially outer face of the rim C, so that one bolt 4 suffices to secure each of the respective stops 2 rigidly in position in engagement with its traction lug D and the radially outer peripheral face of the rim C.

Of course the shape of the stops 2 may be varied, for instance, a type of stop substantially the same in form as the stops herein illustrated, but having but one shoulder or bifurcation 3 might be employed, said stops as applied to the wheel being arranged in staggered relation, but each construction is not as desirable as the preferred and illustrated form inasmuch as it offers full opportunity for confusion in application possibly resulting in inferior performance.

Having thus described my invention, what I claim as new and desire to secure by Letters Patent is:

1. For use with a traction wheel having a plurality of perforated traction lugs rigidly mounted on the radially outer face of its rim or tire, a plurality of stops adapted to be permanently secured respectively to several of said lugs at intervals peripherally of said wheel and having parts in such arranged relation projecting slightly radially beyond the radially outer edges or faces of their respective lugs and adapted to receive between said projecting parts a roadband adapted to be arranged around the wheel in contact with, and supported by, the radially outer faces of said lugs.

2. A stop to be applied to a perforated traction lug of a traction wheel provided with a plurality of traction lugs and having a rim presenting a radially outer portion between said lugs, said stop having a radially inner face of such contour as to bear on both sides, in a transverse direction, of its fastening bolt, against the adjacent portion of said radially outer portion of said rim, and having a perforation registering, in arranged relation, with the perforation in said lug, and formed with portions extending radially beyond said lug to receive between them a third element, and a bolt passing through said perforations and receiving a nut to draw said stop into, and hold it in, tight engagement with said lug and rim.

3. A stop to be applied to a traction lug of a traction wheel, said stop being provided with a shoulder having a substantially radial face to act as a stop for a third element, and having its radially outer lateral portion formed with an inclined plane to aid in applying said third element.

ROBERT W. DORN.